United States Patent
Younkin et al.

(10) Patent No.: US 9,202,033 B2
(45) Date of Patent: Dec. 1, 2015

(54) TECHNIQUES FOR SKIN TONE ACTIVATION

(75) Inventors: Audrey C. Younkin, Hillsboro, OR (US); Philip J. Corriveau, Forest Grove, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 13/997,994

(22) PCT Filed: Dec. 14, 2011

(86) PCT No.: PCT/US2011/064864
§ 371 (c)(1),
(2), (4) Date: Jun. 25, 2013

(87) PCT Pub. No.: WO2013/089699
PCT Pub. Date: Jun. 20, 2013

(65) Prior Publication Data
US 2014/0189854 A1     Jul. 3, 2014

(51) Int. Cl.
*G06F 7/04*     (2006.01)
*G06F 21/32*     (2013.01)
*G06T 7/40*     (2006.01)
*G06K 9/00*     (2006.01)

(52) U.S. Cl.
CPC ............ *G06F 21/32* (2013.01); *G06K 9/00362* (2013.01); *G06K 9/00885* (2013.01); *G06T 7/408* (2013.01); *G06T 2207/10016* (2013.01); *G06T 2207/30196* (2013.01)

(58) Field of Classification Search
CPC ................................. G06F 21/31; G06F 21/32
USPC ............................................................ 726/19
See application file for complete search history.

(56) References Cited

U.S. PATENT DOCUMENTS

| | | | |
|---|---|---|---|
| 8,582,875 B2 * | 11/2013 | Cheddad et al. | ............... 382/165 |
| 2003/0103652 A1 | 6/2003 | Lee et al. | |
| 2004/0091137 A1 | 5/2004 | Yoon et al. | |
| 2005/0249381 A1 | 11/2005 | Silvester et al. | |
| 2007/0113099 A1 | 5/2007 | Takikawa et al. | |
| 2010/0007726 A1 * | 1/2010 | Barbieri et al. | .................. 348/78 |
| 2010/0209000 A1 * | 8/2010 | Usui et al. | ..................... 382/195 |

OTHER PUBLICATIONS

International Search Report and Written Opinion, Mailed Date: May 2, 2012, Application No. PCT/US2011/064864, Filed Date: Dec. 14, 2011, pp. 9.

* cited by examiner

*Primary Examiner* — Teshome Hailu
(74) *Attorney, Agent, or Firm* — Kacvinsky Daisak Bluni PLLC

(57) ABSTRACT

Techniques may be used to authenticate a user to a computing device using their skin tone. A color sample may be received while a computing device remains in a power saving state. A user may be authenticated when the color sample matches a skin tone record. The computing device may be placed in an active state when the user is authenticated. Other embodiments are described and claimed.

28 Claims, 7 Drawing Sheets

200

RECEIVE A COLOR SAMPLE WHILE THE COMPUTING DEVICE REMAINS IN A POWER SAVING STATE
202

AUTHENTICATE A USER WHEN THE COLOR SAMPLE MATCHES A SKIN TONE RECORD
204

PLACE THE COMPUTING DEVICE IN AN ACTIVE STATE WHEN THE USER IS AUTHENTICATED
206

*FIG. 2*

TECHNIQUES FOR SKIN TONE ACTIVATION

BACKGROUND

In order for gesture recognition to occur using a computing device, a camera must typically be activated for long periods of time. The camera often must remain active waiting for a user's gesture input. However, having the camera remain active for a long period of time causes the battery life on the computing device to be depleted.

Current solutions cause platforms in the computing device to enter a sleep mode. Yet, if the camera is in the sleep mode, a user may not be able to awaken the platform based on a gesture alone. Often a user must press a button on the computing device in order for the platform to reactivate.

Alternatively, a camera that is programmed to awaken without needing another external input typically will awaken whenever any sort of motion is detected. For example, a sheet of paper entering the camera's view may cause the camera to awaken unnecessarily. It is with respect to these and other considerations that the present improvements have been needed.

BRIEF DESCRIPTION OF THE DRAWINGS

FIG. 2 illustrates an embodiment of a logic flow for the system of FIG. 1.

DETAILED DESCRIPTION

Figure 1:
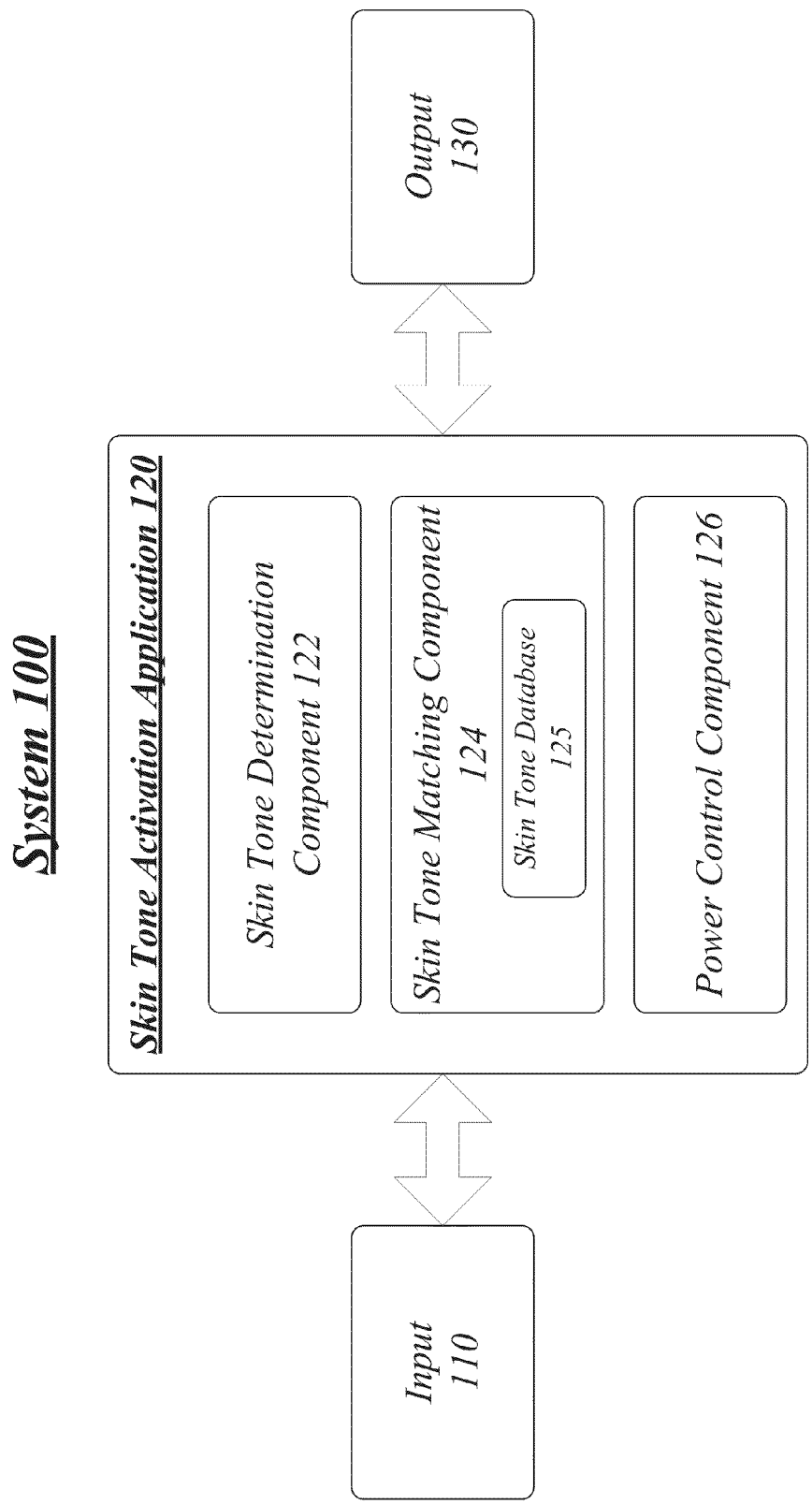
FIG. 1 illustrates an embodiment of a system for skin tone activation.

Various embodiments are directed to skin tone activation. A color sample may be received. In an embodiment, the color sample may be received by a computing device, while the computing device remains in a power saving state. A user may be authenticated when the color sample matches a skin tone record. The computing device may be placed in an active state when the user is authenticated. By using skin tone activation, a user may activate and automatically authenticate into a computing device using gesture recognition. A user, using only his or her hand, arm, face or other body part, may authenticate into the computing device. As the computing device may remain in a power saving state until the user is authenticated, battery life of the computing device can be preserved. As a result, the embodiments can improve affordability, scalability, modularity, extendibility, or interoperability for an operator, device or network.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a block diagram for a system 100. In one embodiment, the system 100 may comprise a computer-implemented system 100 having one or more software applications and/or components. Although the system 100 shown in FIG. 1 has a limited number of elements in a certain topology, it may be appreciated that the system 100 may include more or less elements in alternate topologies as desired for a given implementation.

In an embodiment, the system 100 may be in a power saving state. In an embodiment, the system 100 may be in a power saving state. In an embodiment, some of the sensors of the camera may remain in an active state. In an embodiment, 25% of the sensors of the camera may be in an active state. In an embodiment, between 10-30% of the sensors of the camera may be in an active state while the rest of the camera sensors and the system 100 may remain in a power saving state.

In an embodiment, the one or more sensors that are in an active state may identify a movement. In an embodiment, the sensors may identify an object. For example, the sensors may identify when a user places his or her hands on and/or over the keyboard. For example, the sensors may identify when a piece of paper is placed over the keyboard.

The sensors may take a snapshot of the object. In an embodiment, the sensors may create a color sample based on the snapshot of the object. A color sample may include a photograph of the object taken by the camera.

The system 100 may include a skin tone activation application 120. The skin tone activation application 120 may include a skin tone determination component 122, a skin tone matching component 124 and a power control component 126. The skin tone determination component 122 may identify a color sample.

The color sample may be received by the skin tone determination component 122. In an embodiment, the color sample may be the input 110. The skin tone determination component 122 may determine whether the color sample includes a skin tone. In an embodiment, the skin tone determination component 122 may compare the color sample to known skin tones. In an embodiment, the skin tone determination component 122 may map the color sample in a color space such as the Commission on Illumination (CIE) matrix.

In an embodiment, the skin tone determination component 122 may determine that the color sample is a skin tone. In an embodiment, the skin tone determination component 122 may determine whether the color sample is a part of a user's body. For example, the color sample may be of a user's arm, hand, face, etc. The embodiments are not limited to this example. In an embodiment, the skin tone determination component 122 may perform object recognition and segmentation.

The skin tone matching component 124 may determine whether the color sample matches a skin tone record. In an embodiment, the skin tone matching component 124 may include a skin tone database 125. The skin tone database 125 may include a plurality of skin tone records. In an embodiment, users of the system may have previously created skin tone records which can be used for authentication. The color sample may be compared to the skin tone records in the skin tone database 125 to determine whether there is a match. In an embodiment, the color sample may be compared to the skin tone records using mapping.

In an embodiment, the skin tone activation application 120 may include a power control component 126 to change the computing device from a power saving state to an active state. In an embodiment, the power control component 126 may change the computing device from a power saving state to an active state when the color sample matches a skin tone from the skin tone records in the database.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 2 illustrates one embodiment of a logic flow 200. The logic flow 200 may be representative of some or all of the operations executed by one or more embodiments described herein.

In the illustrated embodiment shown in FIG. 2, the logic flow 200 may receive a color sample via a camera while the computing device remains in a power saving state at block 202. For example, the computing device may be placed in a power saving state when no action occurs for a period of time. In an embodiment, while the computing device is in a power saving state, a camera may be placed in a partial power saving state. The camera may be in a partial power saving state as some of the sensors in the camera may remain in an active state. For example, 25% of the sensors in a camera may be in an active state. For example, between 10-30% of the sensors may be active while the rest of the sensors in the camera may remain in a power saving state. The computing device may remain in a power saving state. In an embodiment, a power saving state may be a sleep mode.

In an embodiment, the camera may determine that there is an object. In an embodiment, the camera may determine the object via movement. The camera may take a picture or snapshot of an object using the active sensors. The rest of the sensors in the camera may remain in a power saving state. In an embodiment, the sensors may identify that there is an object and take a snapshot of the object. In an embodiment, the sensors may create a color sample based on the snapshot of the object. The color sample may be received by the computing device while the computing device remains in a power saving state.

The logic flow 200 may authenticate a user based on the color sample at block 204. For example, a user may be authenticated into the computing device based on the color sample. In an embodiment, the computing system may determine whether the color sample is a skin tone. In an embodiment, the computing system may determine whether the color sample is from a human by analyzing the pixels of the color sample. The pixels of the color sample may be compared with the pixels of a skin tone. In an embodiment a CIE matrix may be used to map the pixels from the color sample into the color space. After the pixels are mapped into a color space, the pixels may be compared to the skin tone color space. The embodiments are not limited to this example.

The color sample may be authenticated by comparing the color sample with a plurality of skin tone records. Skin tone records may be snapshots or color samples of a portion of a user's skin that are stored in a database or table. A skin tone record may be a unique color sample of a particular user's skin tone composition. A skin tone record may have unique pixel characteristics which can be used for authentication. A skin tone record may be associated with a user's profile to allow the user access to a computing device.

For a user to be authenticated, a user may have previously had a snapshot taken of a portion of the user's skin. For example, the snapshot may be of the person's hand, finger, forearm, elbow, face, etc. The prior snapshot may be stored in a database as a skin tone record. In an embodiment, the skin tone record may be the skin tone composition of a user determined using skin tone analysis. At a later time, the user may wish to authenticate at a computing device within a computing system. The user may use that same portion of skin to authenticate with the computing device. A hands-free environment for authentication may allow a user to use a part of his or her body in order to authenticate into the computing system.

For example, a camera associated with a computing device on a computing system may authenticate thirty different users in a company. A user may have previously had a snapshot taken of their hand. At least a portion of the snapshot may be stored as a skin tone record in a skin tone record database. The user may later wish to authenticate using a camera and a computing device in the computing system. The user may place his/her hand so that it may be viewed by the camera. The camera may then create a color sample of the user's hand. It may be determined that the color sample is a skin tone. The skin tone activation application on the computing device may determine whether there is a match between the color sample and one of the skin tone records in the skin tone record database. When there is a match between the color sample and the skin tone record, the user may be authenticated. When the user is authenticated, the user may have access to the computing device. In an embodiment, based on the user's profile associated with his or her skin tone record, a user may be allowed access to certain information in the computing system.

The logic flow 200 may place the computing device in an active state when the user is authenticated at block 206. For example, when the color sample matches a skin tone record, a user may be authenticated. An authenticated user may have access to the computing system. When the user is authenticated, the computing device may change from a power saving state to an active state. In an embodiment, by placing a computing device in an active state, a gesture recognition system on the computing device may be enabled and a user may communicate with the computing device via gestures. The embodiments are not limited to this example.

Figure 3:
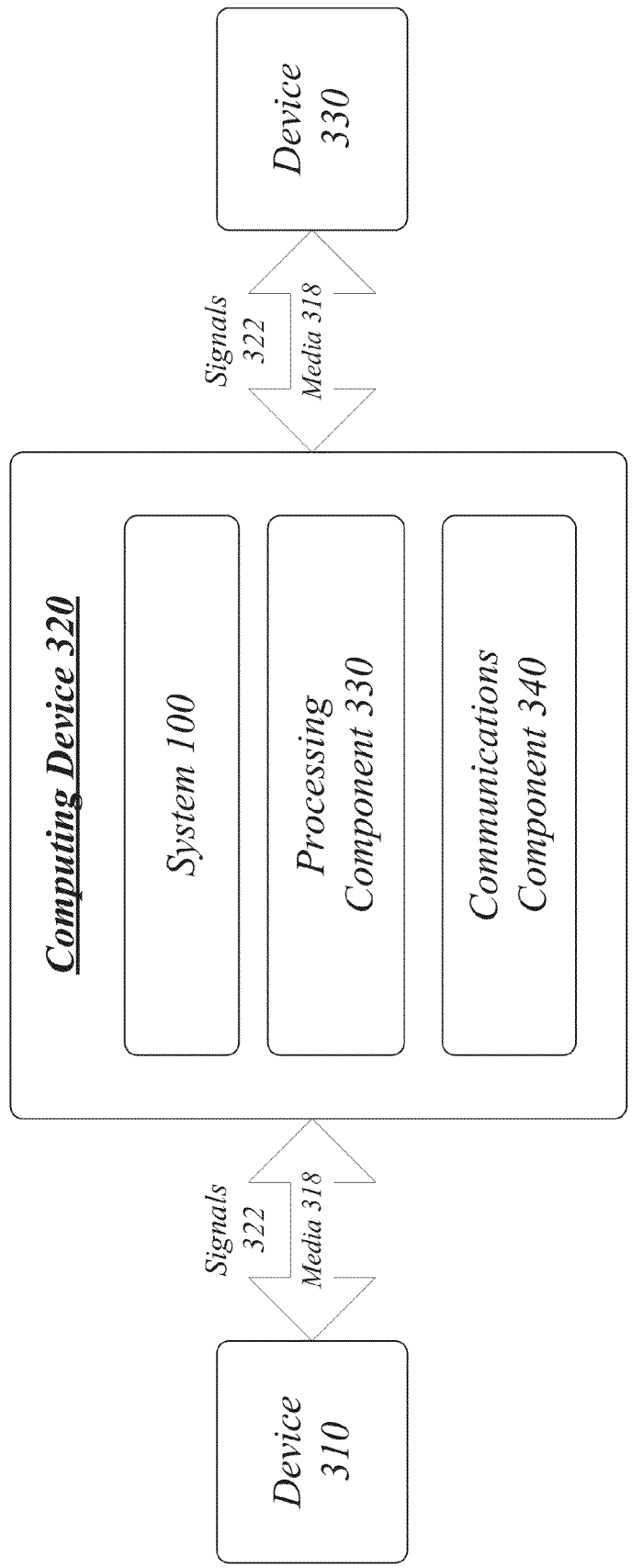
FIG. 3 illustrates an embodiment of a centralized system for the system of FIG. 1.

FIG. 3 illustrates a block diagram of a centralized system 300. The centralized system 300 may implement some or all of the structure and/or operations for the system 100 in a single computing entity, such as entirely within a single computing device 320.

The computing device 320 may execute processing operations or logic for the system 100 using a processing component 330. The processing component 330 may comprise various hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing device 320 may execute communications operations or logic for the system 100 using communications component 340. The communications component 340 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 340 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 318 includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media 318.

The computing device 320 may communicate with other devices 310, 330 over a communications media 318 using communications signals 322 via the communications component 340.

Figure 4:
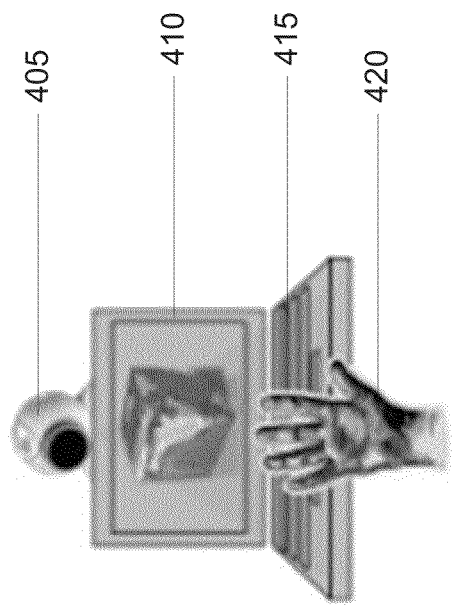
FIG. 4 illustrates an embodiment of a camera and a computing device.

FIG. 4 illustrates an embodiment of a camera and a computing device. The computing device may include a monitor 410 and a keyboard 415. A wide angle camera 405 may detect an object on and/or over the keyboard 415.

As shown in FIG. 4, an object may be a user's hand 420. In an embodiment, the camera 405 may be an external camera. An external camera 405 may be placed on top of the monitor 410. In an embodiment, the camera 405 may be an internal camera. The internal camera 405 may be located at the top part of a computing device, such as, but not limited to, a laptop. In an embodiment, the internal camera 405 may be located above the monitor 410, or screen, of a laptop. In an embodiment, a camera 405 may be used to take a snapshot of an object. In an embodiment, the camera may obtain an image of the object. The camera 405 may send a color sample from the image to the system 100 to determine whether a user may be authenticated. In an embodiment, the camera 405 may be a wide angle camera or a wide lens webcam. In an embodiment, a camera 405 may have high color accuracy. In an embodiment, a camera 405 may have a wide or large area or angle in which to view objects. In an embodiment, a camera 405 may view an entire surface. In an embodiment, a camera 405 may cover the width, depth and height between a keyboard 415 and the display 410. In an embodiment, a camera 405, such as, but not limited to, a wide angle camera, may be used in order to determine an object in a variety of locations that may not be visible to a non-wide angle camera. For example, if a camera 405 is on top of a monitor 410 that is perpendicular to a keyboard 415, then the camera 405 may determine an object, such as a user's hand, is over the keyboard.

In an embodiment, the camera 405 may detect the user's hand 420 above and/or on the keyboard 415. The camera 405 may take a snapshot of the user's hand 420 to create a color sample. The color sample may be sent to the skin tone activation system 100 within the computing device.

Figure 5:
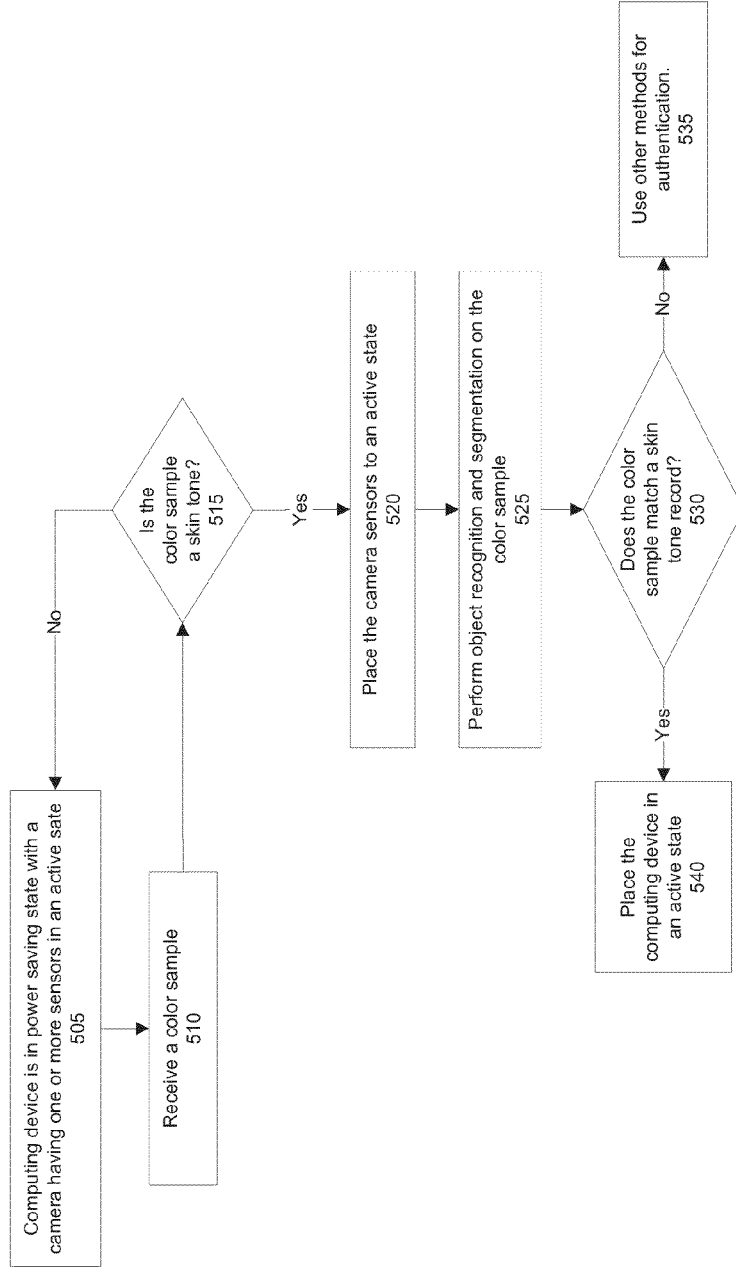
FIG. 5 illustrates an embodiment of a skin activation logic flow.

FIG. 5 illustrates an embodiment of a skin activation logic flow 500. The logic flow 500 may be representative of some or all of the operations executed by one or more embodiments described herein.

In the illustrated embodiment shown in FIG. 5, the logic flow 500 may include a computing device in a power saving state with a camera having one or more sensors in an active state to detect an object at block 505. In an embodiment, the computing device may be in a power saving state as there may have been no activity for a period of time. In an embodiment, a gesture recognition system may be part of the computing device. By having the computing device in a power saving state, the gesture recognition system may be uninitialized until the computing device is placed in an active state. In an embodiment, the computing device may include a platform in a power saving state. In an embodiment, by having the platform in a power saving state, the computing device may reduce power consumption. In an embodiment, having the platform in a power saving state may preserve the battery life of the computing device. In an embodiment, a power saving state may include a sleep mode.

In an embodiment, the camera may be in a partial operational state. In an embodiment, the camera may include multiple sensors. In an embodiment, one or more of the sensors may remain in an active state while the rest of the sensors remain in a power saving state. In an embodiment, the camera may be powered by the computing device. By having the camera remain in a partial operational state or a partial power saving state, power consumption of the computing device may be reduced. In an embodiment, the computing device may be powered by a battery. By having the camera remain in a partial power saving state and the computing device remain in a power saving state, the battery life may be extended.

In an embodiment, the logic flow 500 may receive a color sample at block 510. In an embodiment, one or more of the sensors in an active state inside the camera may detect an object. In an embodiment, the object may be detected by the camera based on motion. In an embodiment, the camera may take a snapshot of the object. In an embodiment, the camera may obtain an image. The camera may create an image of the object. In an embodiment, the color sample of a user may be received from the image. The color sample may be received by the computing device.

In an embodiment, the logic flow 500 may determine whether the color sample is a skin tone at block 515. It may be determined whether the color sample is a skin tone by mapping the pixels of the color sample in the color space. The pixels in the color sample may create a CIE matrix. In an embodiment, the color space of the color sample may be compared to the skin tone space of the skin tone record. In an embodiment, the color space may be compare to the skin tone space to determine whether the color sample is a skin tone.

If the color sample is not a skin tone 515, the computing device may remain in a power saving state. The camera may remain in a partial power saving state with one or more sensors in an active state to detect an object 505. The camera may wait until an object appears and may determine whether that object is a skin tone. By having the computing device remain in a power saving state and the camera remain in a partial power saving state until the color sample is determined to be a skin tone, objects may pass in front of the camera without placing the camera or the computing device into an active mode.

If the color sample is a skin tone 505, the logic flow 500 may place the camera sensors to an active state at block 520. In an embodiment, only some of the camera sensors may be active prior to determining that the color sample is a skin tone. When it is determined that the color sample is a skin tone, more sensors may be placed in an active state. In an embodiment, all of the sensors may be placed in an active or awake state when the color sample is a skin tone. In an embodiment, the sensors on the camera may change from a partial power saving state to an active state.

In an embodiment, the logic flow 500 may perform object recognition and segmentation on the color sample at block 525. In an embodiment, prior to performing object recognition and segmentation, the camera may obtain another color sample. In an embodiment, a second color sample may be obtained in order to ensure that the image on the snapshot was clear and accurate. The computing device may receive another color sample. The new color sample of the user may be determined from the image. In an embodiment, the new color sample of the user may be from a new image. In an embodiment, more and/or all of the camera sensors may be active as the sensors may have become active when the computing device determined that the color sample is a skin tone. In an embodiment, a new color sample from a new image may be created by the camera in the active power state.

Object recognition and segmentation may be performed on the color sample in order to determine that the color sample is an identified body part. Object recognition and segmentation may be performed on the color sample so that the color sample includes that same body part as the skin tone records. For example, the color sample may be of a user's forearm. However, the skin tone samples may be of a user's hand. If the color sample includes only a user's forearm, then the color sample may not match the proper skin tone record.

In an embodiment, the color sample may include a user's forearm and the user's hand. The color sample may be segmented so that the color sample includes only the user's hand and not the user's forearm. By having a color sample with only the user's hand, a match may be determined by comparing the color sample to the skin tone records.

In an embodiment, object recognition and segmentation may be used by a gesture recognition system within the computing device. In an embodiment, by performing object recognition and segmentation on the color sample, once the user is authenticated, a gesture recognition system may use information from the object recognition and segmentation to detect gross and fine gesture movements of the user.

In an embodiment, the logic flow 500 may determine whether the color sample matches a skin tone record at block 530. In an embodiment, the skin tone records may be stored in a database. In an embodiment, the color sample may be compared to a skin tone record in the database to determine whether there is a match. In an embodiment, the color sample may be compared to the skin tone records via mapping.

In an embodiment, the color sample may not match to a skin tone record 530. In an embodiment, the logic flow 500 may use other methods to authenticate the user at block 535. In an embodiment, other methods of authentication may be used because the computing device determined that a user is trying to authenticate. Because the color sample is a skin tone, the computing device can determine that there is a human user trying to authenticate. The computing device may provide an alternate way for the user to authenticate.

For example, the computing device may enable the keyboard for a user to type a name and/or password in order to authenticate. In an embodiment, the computing device may enable a mouse for a user to use in order to authenticate. In an embodiment, the computing device may remain in a power saving state until the user has successfully authenticated. In an embodiment, when the user has successfully authenticated, the computing device my change to an active state. In an embodiment, when the user has successfully authenticated, a voice command may be used to initiate a gesture based input.

In an embodiment, the color sample may match a skin tone record 530. In an embodiment, the logic flow 500 may place the computing device in an active state at block 540. In an embodiment, the color sample may provide authentication for a user. In an embodiment, as a result of the authentication, the computing device may be placed in an active state. In an embodiment, by keeping the computing device in a power saving state until the user is authenticated, power consumption may be reduced and battery life may be extended for the computing device.

In an embodiment, when the computing device is in an active state, gesture recognition may be used. The user may immediately use a gesture based input once the user is authenticated into the system with a color sample match. In an embodiment, an initial hand gesture may allow the system-wide gesture commands to be turned on or off. By initially turning system-wide gesture commands on or off, power consumption may be reduced and the battery life saved and/or extended.

In an embodiment, gesture recognition software may allow a user to do basic tasks on the computing device using one or more gesture commands. For example, a wave of the right hand may initiate a new e-mail composition. In an embodiment, a gesture command may be used to place the computing device back in a power saving state. In an embodiment, the gesture command may place the camera in a partial power saving state.

In an embodiment, the computing device may be placed back in a power saving state and the camera placed in a partial power saving state when a certain amount of time has elapsed since the last input. For example, a user may use gesture recognition to communicate with the computing device. If the system has not received any gestures from the user for a time interval such as, but not limited to, 1 minute, 5 minutes and/or 10 minutes, the computing device may be placed back in a power saving state and the camera placed in a partial power saving state. In an embodiment, the time interval may be shorter or longer. In an embodiment, the time period may be predetermined. In an embodiment, the time period may be determined based on how frequently a user gestures. In an embodiment, the time period may be set by the user. The embodiments are not limited to these examples.

Figure 6:
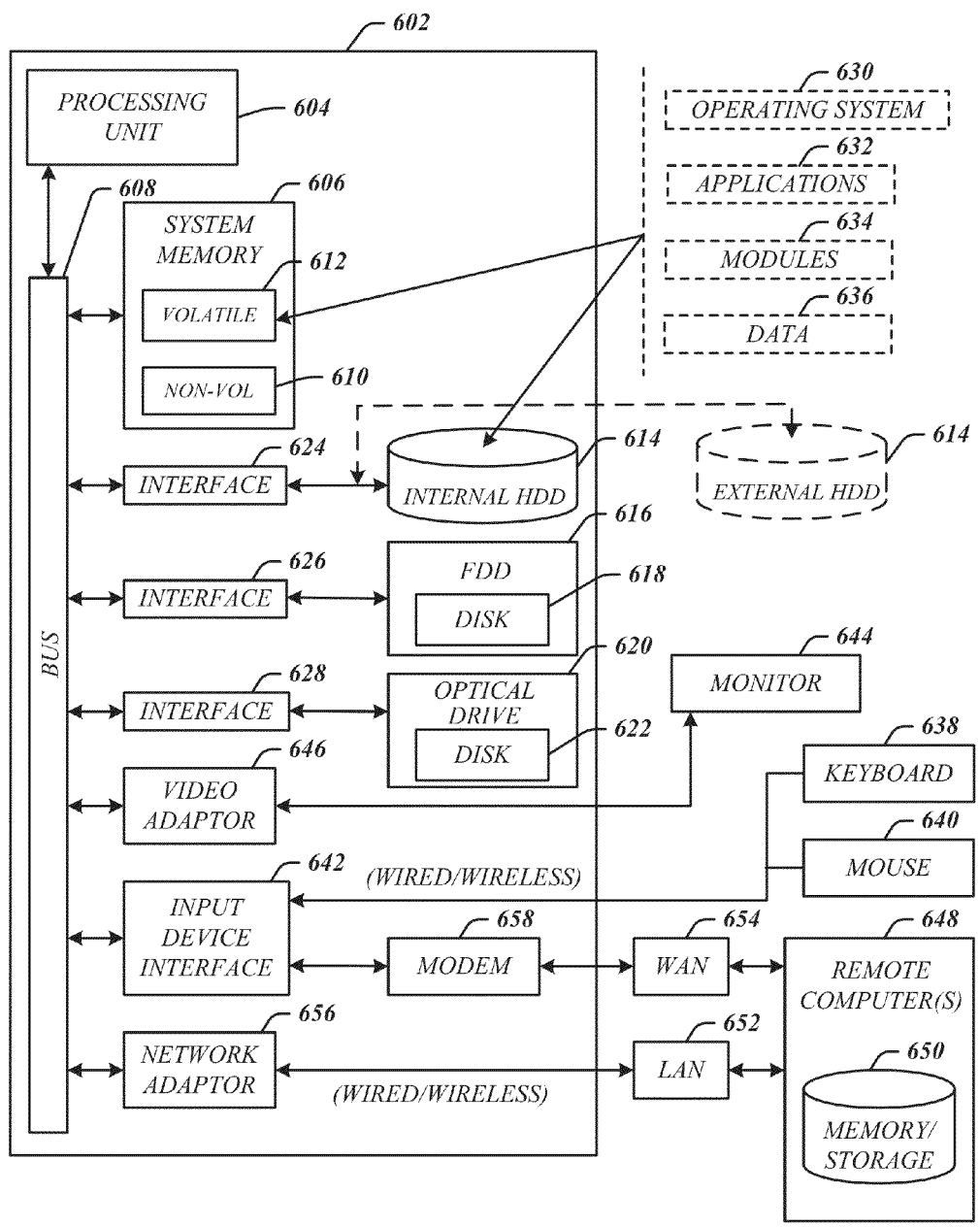
FIG. 6 illustrates an embodiment of a computing architecture.

FIG. 6 illustrates an embodiment of an exemplary computing architecture 600 suitable for implementing various embodiments as previously described. As used in this application, the terms "system" and "component" are intended to refer to a computer-related entity, either hardware, a combination of hardware and software, software, or software in execution, examples of which are provided by the exemplary computing architecture 600. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In one embodiment, the computing architecture 600 may comprise or be implemented as part of an electronic device. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a hand-held computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. The embodiments are not limited in this context.

The computing architecture 600 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 600.

As shown in FIG. 6, the computing architecture 600 comprises a processing unit 604, a system memory 606 and a system bus 608. The processing unit 604 can be any of various commercially available processors. Dual microprocessors and other multi-processor architectures may also be employed as the processing unit 604. The system bus 608 provides an interface for system components including, but not limited to, the system memory 606 to the processing unit 604. The system bus 608 can be any of several types of bus structure that may further interconnect to a memory bus (with or without a memory controller), a peripheral bus, and a local bus using any of a variety of commercially available bus architectures.

The computing architecture 600 may comprise or implement various articles of manufacture. An article of manufacture may comprise a computer-readable storage medium to store logic. Embodiments may also be at least partly implemented as instructions contained in or on a non-transitory computer-readable storage medium, which may be read and executed by one or more processors to enable performance of the operations described herein. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like.

The system memory 606 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 6, the system memory 606 can include non-volatile memory 610 and/or volatile memory 612. A basic input/output system (BIOS) can be stored in the non-volatile memory 610.

The computer 602 may include various types of computer-readable storage media in the form of one or more lower speed memory units, including an internal hard disk drive (HDD) 614, a magnetic floppy disk drive (FDD) 616 to read from or write to a removable magnetic disk 618, and an optical disk drive 620 to read from or write to a removable optical disk 622 (e.g., a CD-ROM or DVD). The HDD 614, FDD 616 and optical disk drive 620 can be connected to the system bus 608 by a HDD interface 624, an FDD interface 626 and an optical drive interface 628, respectively. The HDD interface 624 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 610, 612, including an operating system 630, one or more application programs 632, other program modules 634, and program data 636.

The one or more application programs 632, other program modules 634, and program data 636 can include, for example, a skin tone determination component 122, a skin tone matching component 124, and a power control component 126.

A user can enter commands and information into the computer 602 through one or more wire/wireless input devices, for example, a keyboard 638 and a pointing device, such as a mouse 640. Other input devices may include a microphone, an infra-red (IR) remote control, a joystick, a game pad, a stylus pen, touch screen, or the like. These and other input devices are often connected to the processing unit 604 through an input device interface 642 that is coupled to the system bus 608, but can be connected by other interfaces such as a parallel port, IEEE 1394 serial port, a game port, a USB port, an IR interface, and so forth.

A monitor 644 or other type of display device is also connected to the system bus 608 via an interface, such as a video adaptor 646. In addition to the monitor 644, a computer typically includes other peripheral output devices, such as speakers, printers, and so forth.

The computer 602 may operate in a networked environment using logical connections via wire and/or wireless communications to one or more remote computers, such as a remote computer 648. The remote computer 648 can be a workstation, a server computer, a router, a personal computer, portable computer, microprocessor-based entertainment appliance, a peer device or other common network node, and typically includes many or all of the elements described relative to the computer 602, although, for purposes of brevity, only a memory/storage device 650 is illustrated. The logical connections depicted include wire/wireless connectivity to a local area network (LAN) 652 and/or larger networks, for example, a wide area network (WAN) 654. Such LAN and WAN networking environments are commonplace in offices and companies, and facilitate enterprise-wide computer networks, such as intranets, all of which may connect to a global communications network, for example, the Internet.

When used in a LAN networking environment, the computer 602 is connected to the LAN 6652 through a wire and/or wireless communication network interface or adaptor 656. The adaptor 656 can facilitate wire and/or wireless communications to the LAN 652, which may also include a wireless access point disposed thereon for communicating with the wireless functionality of the adaptor 656.

When used in a WAN networking environment, the computer 602 can include a modem 658, or is connected to a communications server on the WAN 654, or has other means for establishing communications over the WAN 654, such as by way of the Internet. The modem 658, which can be internal or external and a wire and/or wireless device, connects to the system bus 608 via the input device interface 642. In a networked environment, program modules depicted relative to the computer 602, or portions thereof, can be stored in the remote memory/storage device 650. It will be appreciated that the network connections shown are exemplary and other means of establishing a communications link between the computers can be used.

The computer 602 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 7:
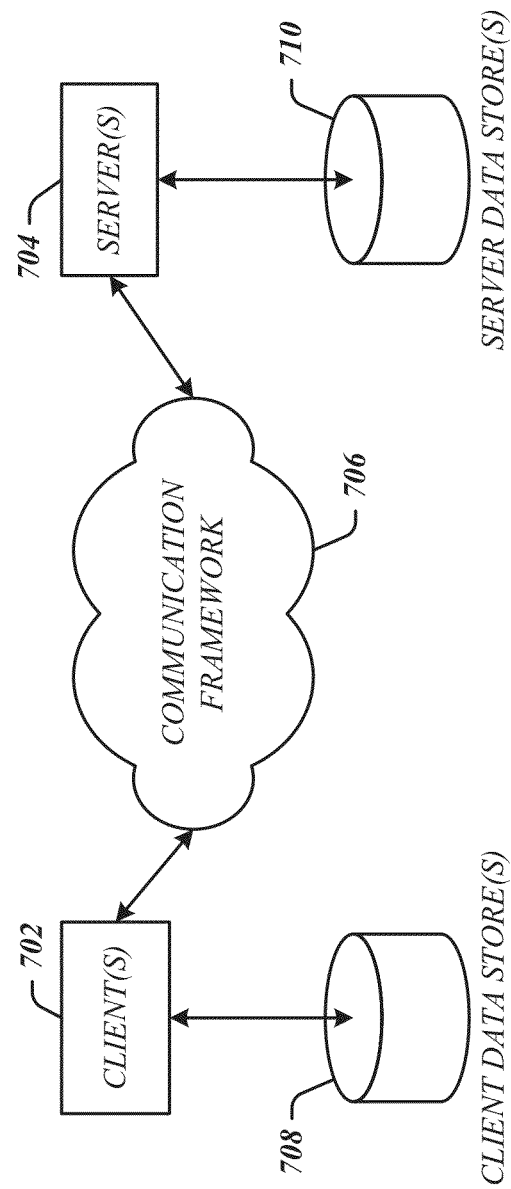
FIG. 7 illustrates an embodiment of a communications architecture.

FIG. 7 illustrates a block diagram of an exemplary communications architecture 700 suitable for implementing various embodiments as previously described. The communications architecture 700 includes various common communications elements, such as a transmitter, receiver, transceiver, radio, network interface, baseband processor, antenna, amplifiers, filters, and so forth. The embodiments, however, are not limited to implementation by the communications architecture 700.

As shown in FIG. 7, the communications architecture 700 comprises includes one or more clients 702 and servers 704. The clients 702 and the servers 704 are operatively connected to one or more respective client data stores 708 and server data stores 710 that can be employed to store information local to the respective clients 702 and servers 704, such as cookies and/or associated contextual information.

The clients 702 and the servers 704 may communicate information between each other using a communication framework 706. The communications framework 806 may implement any well-known communications techniques and protocols, such as those described with reference to systems 200, 300 and 500. The communications framework 806 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. An article of manufacture comprising a non-transitory storage medium containing instructions that when executed cause a system to:
receive a color sample of a user from an image;
determine that the color sample is a skin tone;

determine whether the skin tone matches a skin tone sample of a skin tone record, the skin tone record to include an indication of the skin tone sample and an indication of a body part sample;

perform object recognition and segmentation on the color sample;

identify a body part corresponding to the skin tone based in part on the object recognition and segmentation;

determine whether the body part matches the body part sample; and authenticate the user based on a determination that the skin tone matches the skin tone sample and the body part matches the body part sample.

2. The article of manufacture of claim 1, comprising instructions that when executed cause the system to:

receive the color sample while the system remains in a power saving state.

3. The article of manufacture of claim 1, comprising instructions that when executed cause the system to:

place the system in an active state when the user is authenticated.

4. The article of manufacture of claim 1, comprising instructions that when executed cause the system to:

receive the color sample via a wide angle camera.

5. The article of manufacture of claim 1, comprising instructions that when executed cause the system to:

identify the color sample while one or more sensors in a camera remain in a power saving state; and place all the sensors in the camera in an active state when the color sample is a skin tone.

6. The article of manufacture of claim 1, comprising instructions that when executed cause the system to:

map the color sample to the skin tone record in a database.

7. The article of manufacture of claim 1, comprising instructions that when executed cause the system to:

determine that the color sample is a skin tone using a Commission on Illumination matrix.

8. The article of manufacture of claim 1, wherein the color sample is a first color sample, the image is a first image, the skin tone a first skin tone, the body part a first body part, and the skin tone record a first skin tone record, the article of manufacture comprising instructions that when executed cause the system to:

receive a second color sample from a second image;

determine that the second color sample is a second skin tone;

determine whether the second skin tone matches a second skin tone sample of a second skin tone record corresponding to the user, the second skin tone record to include an indication of the second skin tone sample and an indication of a second body part sample;

perform object recognition and segmentation on the second color sample;

identify a second body part corresponding to the second skin tone based in part on the object recognition and segmentation of the second color sample;

determine whether the second body part matches the second body part sample; and authenticate the user based on a determination that the skin tone matches the skin tone sample, the body part matches the body part sample, the second skin tone matches the second skin tone sample, and the second body part matches the second body part sample.

9. The article of manufacture of claim 8, the first body part and the second body part different body parts.

10. A method, comprising:

receiving, at a computing device, a color sample while the computing device is in a power saving state;

determining whether the color sample matches a skin tone sample of a skin tone record, the skin tone record to include an indication of the skin tone sample and an indication of a body part sample;

performing object recognition and segmentation on the color sample;

identifying a body part corresponding to the color sample based in part on the object recognition and segmentation;

determining whether the body part matches the body part sample; and authenticating the user based on a determination that the skin tone matches the skin tone sample and the body part matches the body part sample; and placing the computing device in an active state when the user is authenticated.

11. The method of claim 10, comprising:

determining that the color sample comprises a skin tone.

12. The method of claim 10, comprising:

receiving a color sample via a wide angle camera.

13. The method of claim 10, comprising:

identifying the color sample while one or more sensors in a camera remain in a power saving state; and placing all the sensors in the camera in an active state when the color sample comprises a skin tone.

14. The method of claim 10, comprising:

mapping the identified color sample to the skin tone record in a database.

15. The method of claim 10, comprising:

determining whether the color sample comprises a skin tone using a Commission on Illumination matrix.

16. The method of claim 10, comprising:

determining that the color sample is not a skin tone while the computing device remains in the power saving state.

17. The method of claim 10, wherein the color sample is a first color sample, the image is a first image, the skin tone is a first skin tone, the body part is a first body part, and the skin tone record a first skin tone record, the method comprising:

receiving a second color sample from a second image;

determining that the second color sample is a second skin tone;

determining whether the second skin tone matches a second skin tone sample of a second skin tone record, the second skin tone record to include an indication of the second skin tone sample and an indication of a second body part sample;

performing object recognition and segmentation on the second color sample;

identifying a body part corresponding to the second skin tone based in part on the object recognition and segmentation;

determining whether the second body part matches the second body part sample; and authenticate the user based on a determination that the first skin tone matches the first skin tone sample, the first body part matches the first body part sample, the second skin tone matches the second skin tone sample, and the second body part matches the second body part sample.

18. The method of claim 17, the first body part and the second body part different body parts.

19. An apparatus comprising:
a hardware processor;
a skin tone determination component operative on the hardware processor to:
 receive a color sample from an image:
 perform, using the hardware processor, object recognition and segmentation on the color sample; and
 determine, using the hardware processor, whether the color sample comprises a skin tone; and
a skin tone matching component to:
 determine whether the skin tone matches a skin tone sample of a skin tone record the skin tone record to include an indication of the skin tone sample and an indication of a body part sample;
 identify a body part corresponding to the skin tone based in part on the object recognition and segmentation; and
 determine whether the body part matches the body part sample.

20. The apparatus of claim 19, comprising:
a skin tone database comprising a plurality of skin tone records.

21. The apparatus of claim 19, comprising:
a power control component to change the apparatus from a power saving state to an active state when the color sample matches a skin tone record in a database.

22. The apparatus of claim 19, comprising:
a wide angle camera communicatively coupled to the hardware processor, the wide area camera to obtain the image.

23. The apparatus of claim 19, comprising:
a digital display communicatively coupled to the hardware processor.

24. A system, comprising:
a processing unit;
a memory to store a skin tone activation application;
an operating system to load the skin tone activation application on the processing unit, the skin tone activation application operative on the processing unit to:
 receive a color sample from an image;
 determine whether the color sample comprises a skin tone;
 determine whether the skin tone matches a skin tone sample of a skin tone record, the skin tone record to include an indication of the skin tone sample and an indication of a body part sample;
 perform object recognition and segmentation on the color sample; and
 identify a body part corresponding to the skin tone based in part on the object recognition and segmentation;
 determine whether the body part matches the body part sample; and
 generate an authentication signal based on a determination that the skin tone matches the skin tone sample and the body part matches the body part sample; and
an interface to communicate authentication signal between the processing unit and the operating system.

25. The system of claim 24, comprising:
a wide angle camera communicatively coupled to the processing unit, the wide area camera to obtain the image.

26. The system of claim 24, the skin tone activation application operative on the processing unit to change the operating state from a power saving state to an active state when the color sample matches a skin tone record in a database.

27. The system of claim 24, wherein the color sample is a first color sample, the image is a first image, the skin tone a first skin tone, the body part a first body part, and the skin tone record a first skin tone record, the skin tone activation application operative on the processing unit to:
receive a second color sample from a second image;
determine that the second color sample is a second skin tone;
determine whether the second skin tone matches a second skin tone sample of a second skin tone record, the second skin tone record to include an indication of the second skin tone sample and an indication of a second body part sample;
perform object recognition and segmentation on the second color sample;
identify a body part corresponding to the skin tone based in part on the object recognition and segmentation;
determine whether the body part matches the body part sample; and
generate the authentication signal based on a determination that the first skin tone matches the first skin tone sample, the first body part matches the first body part sample, the second skin tone matches the second skin tone sample, and the second body part matches the second body part sample.

28. The system of claim 27, the first body part and the second body part different body parts.

* * * * *